United States Patent [19]

Steinkraus

[11] 4,391,706
[45] Jul. 5, 1983

[54] FILTER ELEMENT SEALING DEVICE FOR FILTER PAN

[76] Inventor: Richard W. Steinkraus, 5111 Willowbrook La., Lakeland, Fla. 33803

[21] Appl. No.: 341,074

[22] Filed: Jan. 20, 1982

[51] Int. Cl.³ .................... B01D 33/24; B01D 33/34
[52] U.S. Cl. .................................. 210/232; 210/330; 210/344; 210/450; 210/DIG. 12
[58] Field of Search ............... 210/232, 234, 328, 330, 210/331, 333.01, 333.1, 344, 345, 346, 347, 450, 460, 461, 483, 486, 498, DIG. 12

[56] References Cited
U.S. PATENT DOCUMENTS

| Re. 24,150 | 5/1956 | Delruelle | 210/203 |
|---|---|---|---|
| 2,888,142 | 5/1959 | Roos | 210/450 |
| 3,080,063 | 3/1963 | Krynski | 210/330 |
| 3,216,576 | 11/1965 | Roos | 210/330 |
| 3,289,840 | 12/1966 | Kahn | 210/232 |
| 3,426,909 | 2/1969 | Garner | 210/344 |
| 3,491,886 | 1/1970 | Glos | 210/232 |
| 3,643,803 | 2/1972 | Glos | 210/232 |
| 4,179,378 | 12/1979 | Borre | 210/232 |

Primary Examiner—Ernest G. Therkorn
Attorney, Agent, or Firm—Frijouf, Rust & Pyle

[57] ABSTRACT

A filter element sealing device for a filter pan in which a rubber sealing strip cooperates with one or more ledges formed in the peripheral sidewall of the pan to lock the edge of the filter element between the sealing strip and the sidewall of the pan. A metal plate cooperates with the sidewall of the pan to merge the sealing strip against the sidewall of the pan to secure the filter element therebetween.

11 Claims, 13 Drawing Figures

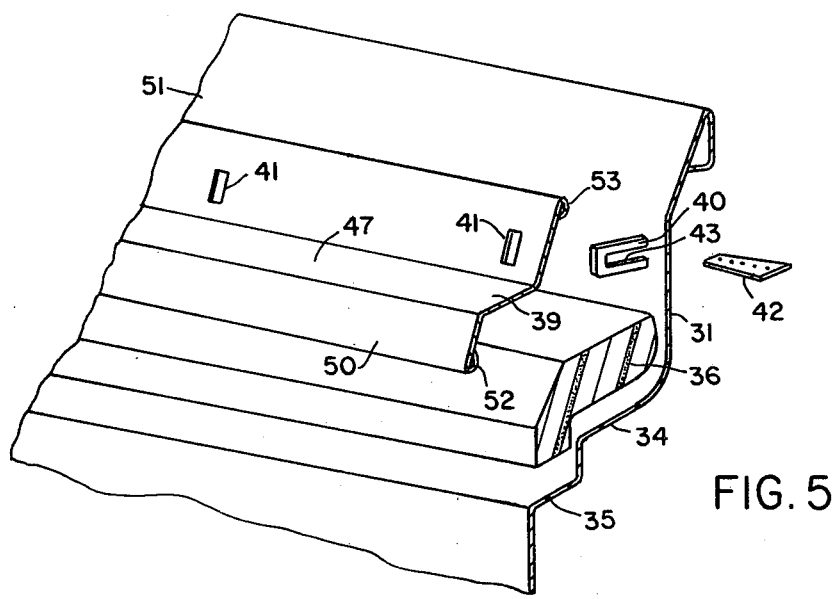
FIG. 5
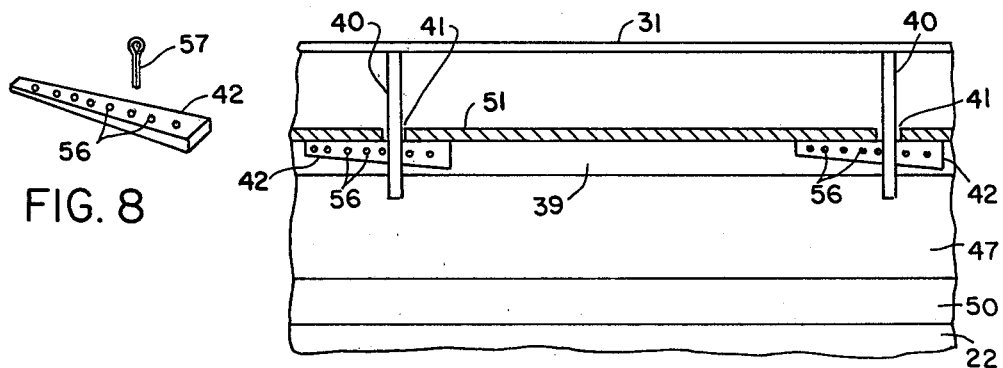
FIG. 8
FIG. 7
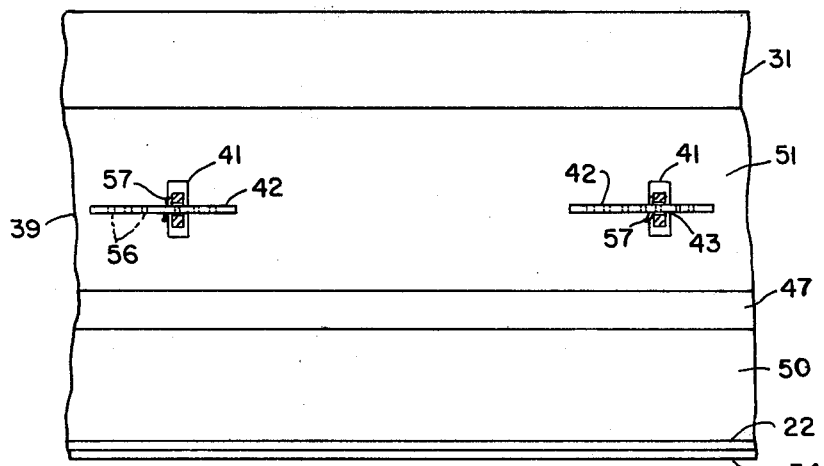
FIG. 9

FILTER ELEMENT SEALING DEVICE FOR FILTER PAN

BACKGROUND OF THE INVENTION

1. Field of the Invention

This invention relates to a filter element sealing device for a filter pan and more particularly to a sealing device for a filter pan used in the manufacture of various products such as phosphoric acid from phosphoric ore.

2. Description of the Prior Art

Because of the ever increasing demand for phosphates as agricultural soil fertilizers, the manufacture of phosphates from phosphoric ore has become a major industry. Various processes have been employed in obtaining phosphates from the phosphoric ores but these processes generally fall into two categories: firstly, the elemental phosphorus process and secondly, the wet acid process. The wet acid process involves crushing and grading raw phosphate rock known as Fluorapatite and treating this crushed rock with an acid such as sulphuric acid to obtain a single, super-phosphate which is a mixture of calcium sulphate and mono-calcium phosphate.

In the wet acid process, the crushed Fluorapatite is treated with sulphuric acid in a digester. Slurry from the digester is then fed to a filtration unit where phosphoric acid is separated from the calcium sulphate precipitate. This separation is carried out by the application of partial vacuum applied to the underside of the filter element.

A typical filtration unit utilized in the phosphate industry for the separation of calcium sulphate is of generally circular configuration. The filtration unit includes twenty-four filter pan cells of substantially trapezoidal shape arranged as partial sectors of the circular filtration unit. Each filter pan cell is provided with means to enable the pan to rotate about a radial axis of the circular unit.

The filter pans are driven about a vertical axis of the circular unit so that each filter pan will progressively pass through various stations. At the first station the pan is filled with feed slurry from the digester. When the pan has been filled, partial vacuum is applied to the underside of the filter element to draw off undiluted mother liquor, which is phosphoric acid. At the next station, the filter pan, which now contains a filter cake of calcium sulphate, is sprayed with a weak wash liquor returned from the operations performed on the filter cake at the next station. Vacuum is again applied to the underside of the filter element to draw off the strong wash liquor having a concentraton of phosphoric acid less than the undiluted mother liquor extracted at the first station. During the next station wash water is applied to the calcium sulphate filter cake while vacuum is applied to extract a weak wash liquor which is returned to the second station for spraying onto the filter cake. The next station includes rotation of the filter pan cell to invert the pan to empty the filter cake therefrom. At this station, instead of a vacuum, air is blown through the underside of the filter element to dislodge the filter cake. At the following station, water is sprayed upwardly into the inverted filter pan to clean the pan of calcium sulphate precipitate. The pan is then dried and ready to receive the next supply of slurry from the digester.

The above filtration unit thus operates on a continuous basis with the filter pans rotating through all of the above stations every three to five minutes. During the above filtraton process, due to the large quantities of slurry being handled, the filter element is often damaged and this necessitates the removal of the filter element from the filter pan and the subsequent replacement of the filter element. Because of the corrosive nature of the calcium sulphate precipitate and because of the manner in which the precipitate rapidly hardens, serious problems have been experienced when trying to change filter elements as the precipitate manages to clog the joint between the filter element and the filter pan.

U.S. Pat. Re No. 24,150 to Delruelle relates to a continuous rotary filter of the tilting cell type in which the filter cloth is secured to the base of the pan cell by a rubber sealing strip of circular cross-section inserted within a correspondingly shaped undercut groove in the base of the pan cell.

U.S. Pat. No. 3,426,909 to Garner describes a filter element anchoring means including two upright members each having a bulbous portion at the upper end thereof. The filter cloth is inserted within an elongated pocket formed between the bulbous portions and is locked within this pocket by a resilient caulking strip of rope or rubber.

U.S. Pat. No. 3,080,063 to Kryrski et al discloses a channel-shaped groove for retaining a filter element therein. The filter element is held within the groove by caulking material.

None of the above prior art teaches a positive means other than the caulking material itself for retaining the filter cloth within the groove or pocket.

Serious problems have been experienced with the prior art sealing devices in that the calcium sulphate precipitate rapidly hardens to clog the caulking strip within the groove thus making the removal of the filter element extremely difficult.

Experience has shown that on the average one and one-quarter hours is required by a team of fitters to replace such a filter cloth and that these fitters have had to resort to the use of power chisels to dislodge hardened precipitate from the sealing ring. This downtime is not only costly in terms of man hours lost, but more importantly, the production of phosphates is lost while the whole unit is shut down for repairs.

An attempt has been made in the prior art to alleviate this problem by providing an annular groove in the wall of the filter pan. In this arrangement, a sealing ring urges the filter element within the annular groove and locks the filter element therein by means of a plate bolted to the sidewall of the pan. The above arrangement has proved unsatisfactory as the precipitate manages to enter the cracks between the sealing ring and the filter element where it lodges and hardens.

The present invention seeks to provide a simple and inexpensive means of overcoming the foregoing problems. The primary objective and advantage of the present invention is the provision of a sealing device which can easily be removed from the sidewall of a filter pan to facilitate replacement of a filter element.

A further objective and advantage of the present invention is the provision of a sealing device that effectively prevents the ingress of material past the seal.

Another object of the present invention is the provision of a sealing device which may be easily installed in a fraction of the time required by the prior art process.

Another object of the present invention is the provision of a sealing device which eliminates the necessity of grooves capable of trapping calcium sulphate precipitate.

Further objects and advantages of the present invention will become apparent from the study of the following portions of the specification, the claims and the attached drawings.

The foregoing has outlined some of the more pertinent objects of the present invention. These objects should be construed to be merely illustrative of some of the more prominent features and applications of the invention. Many other beneficial results can be obtained by applying the disclosed invention in a different manner or modifying the invention within the scope of the disclosure particularly with regard to the use of the invention disclosed herein. This should not be construed as limited to a filter element sealing device for a filter pan but should include other applications in which any filter element is to be sealed at its edge.

SUMMARY OF THE INVENTION

The invention is defined by the appended claims with specific embodiments shown in the attached drawings. For the purpose of summarizing the invention, the invention may be incorporated into a filter pan for sealing a filter element to the sidewall of the filter pan. The invention includes a filter pan filter element sealing device comprising a filter pan sidewall having a ledge and a sealing strip cooperating with the ledge with means for urging the strip against the ledge to secure the filter element between the strip and the ledge. The means for urging the strip against the ledge includes a plate which is secured to the sidewall of the filter pan. The plate, which extends along the length of the sidewall, is removably secured to the sidewall. Additionally, the plate has two longitudinal edges, each edge having an inwardly turned flange. Each flange urges the sealing strip against the sidewall of the pan. The plate is secured to the sidewall of the pan by various means including pin bar guides disposed on the sidewall of the pan. An upper portion of the plate has apertures each of which receive a pin bar guide inserted therein. Each guide includes a slot for receiving a cotter pin inserted therein. An intermediate portion of the plate cooperates with the upper surface of the sealing strip. The sealing strip includes an outer upper face which cooperates with the intermediate portion of the plate and an inner lower face, both faces lying in planes substantially parallel to the plane of the filter element. The sealing strip is of rubber.

The present invention further includes a sealing device in which the plate is of inverted L-shaped cross-section. The upper outer surface of the plate reacts with a cam surface of a member pivotably mounted on a bracket secured to the sidewall. The cam surface has a stop portion which cooperates with a vertical portion of the plate. An aperture defined by the pivotably mounted member aligns with a further aperture defined by the bracket when the stop portion cooperates with the vertical portion to urge the sealing strip against the sidewall of the pan. When the stop portion cooperates with the vertical portion to urge the sealing strip against the sidewall, a split pin is inserted into the aligned apertures.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject matter of the claims of the invention. It should be appreciated by those skilled in the art that the conception and specific embodiment disclosed may be readily utilized as a basis for modifying or designing other devices for carrying out the same purposes of the present invention. It should also be realized by those skilled in the art that such equivalent constructions do no depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is an exploded view of the filter element sealing device of FIG. 4;

FIG. 7 is a cross-sectional view of the pin bar guide means taken on line 7—7 of FIG. 4;

FIG. 8 is an enlarged perspective view of the pin bar shown in FIG. 7;

FIG. 9 is a cross-sectional view taken on line 9—9 of FIG. 4;

Similar reference characters refer to similar parts throughout the several views of the drawings.

DETAILED DESCRIPTION

Figure 1:
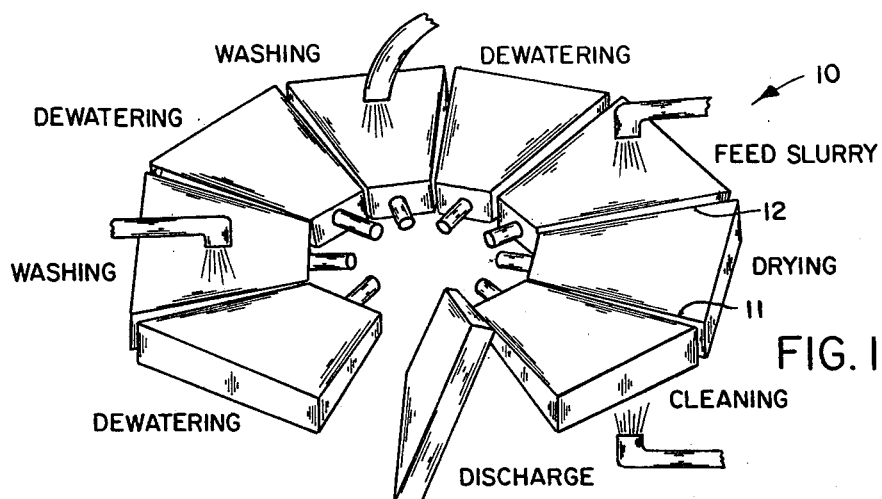
FIG. 1 is a diagrammatic view of a filtration unit showing the operating cycle of the filter pans.

FIG. 1 is a diagrammatic representation of a continuous filtration unit in which the various filter pans rotate through stations at which slurry is fed into a filter pan, phosphoric acid is removed, the cake is washed and then discharged. This process is well known to those skilled in the art and was described in the Background of the Invention.

Figure 2:
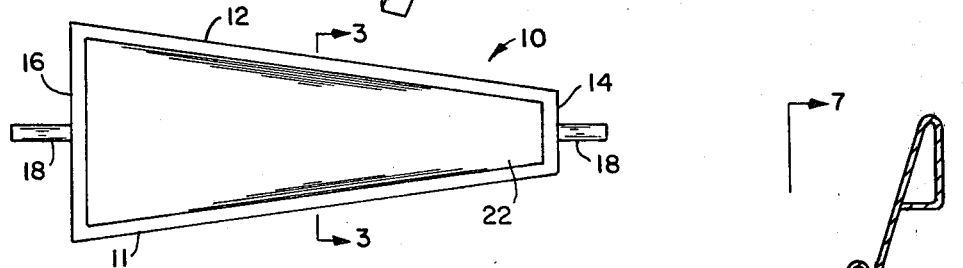
FIG. 2 is a top view of a filter pan of FIG. 1.

FIG. 2 illustrates a filter pan 10 having sidewalls 11 and 12 and endwalls 14 and 16. Shaft 18 supports the pan 10 and enables the pan 10 to rotate as shown in FIG. 1.

Figure 3:
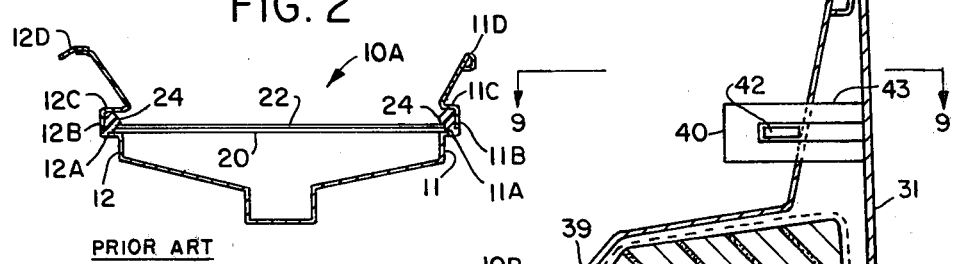
FIG. 3 is a cross-sectional view along line 3—3 of a prior art filter pan of FIG. 2.

FIG. 3 is a cross-sectional view along line 3—3 of FIG. 2 illustrating a prior art pan 10A. A porous plate or grid 20 is disposed on sidewall portions or ledges 11A and 12A to support a filter 22. Sidewall portions 11A–11C and 12A–12C create grooves for receiving a rubber sealing gasket 24 for holding the filter 22 in position on the porous plate 20. The terminal end 11D of sidewall 11 receives a lip of the next adjacent pan 10A similar to the lip 12D of sidewall 12.

This prior art pan 10A provided an adequate seal for filter 22 but enabled calcium sulphate precipitate to enter the grooves formed by sidewall portions 11A-11C and 12A-12C. Accordingly, a substantial amount of time, typically one and one-quarter hours, was required to remove the hardened calcium sulfate from the grooves and to replace the filter 22.

Figure 4:
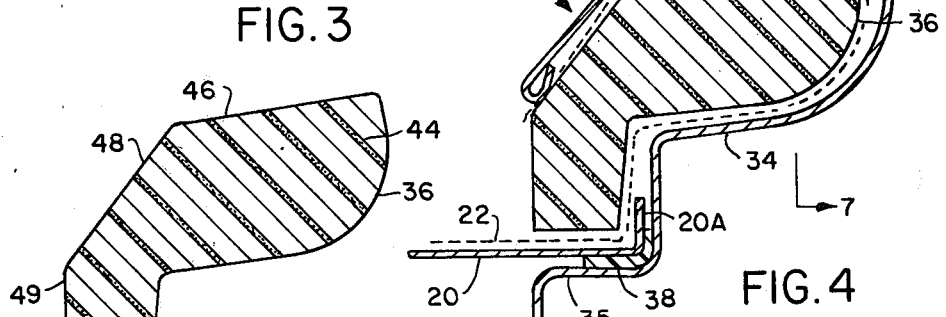
FIG. 4 is a cross-sectional view of a filter pan of the present invention.

FIG. 4 is an enlarged cross-sectional view of a first embodiment of the present invention. In this embodiment, the pan 10B comprises a sidewall 31 having ledges 34 and 35. Ledge 34 is curved as shown to reduce the buildup of calcium sulphate therein. A rubber caulking or sealing strip 36 cooperates with ledges 34 and 35 as will be described hereinafter.

The filter element 22 is supported by a grid 20. Grid 20 has an upturned rim 20A which cooperates with and is supported by a rubber sealing element 38. The edge of the filter element 22 is secured between the sealing strip 36 and ledges 34 and 35 of sidewall 31. A longitudinally extending plate 39 urges the sealing strip against the sidewall 31 and ledges 34 and 35 with the filter element 22 therebetween.

FIG. 5 is an exploded view of the first embodiment of the present invention. The plate 39 is removably secured to the sidewall 31. The means for securing the plate 39 to sidewall 31 includes a pin bar guide 40 welded to the sidewall 31. The pin bar guide 40 passes through apertures 41 of plate 39. A wedge-shaped pin bar 42 reacts with a slot 43 of the pin bar guide 40 and plate 39 to lock plate 39 to the wall 31. The plate 39 thus urges the sealing gasket 36 against the sidewall 31 and ledges 34 and 35.

Figure 6:
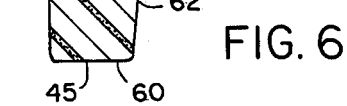
FIG. 6 is a cross-sectional view of the sealing strip.

Referring to FIG. 6 which is a cross-sectional view of the rubber caulking or sealing strip 36, the strip is of an inverted L-shaped cross-section with an upper arm 44 contoured to cooperated with ledge 34. A lower arm 45 is shaped to conform with the lower ledge 35 of the sidewall 31. The upper arm 44 is generally thicker than the lower arm 45. The sealing strip 36 has an outer horizontal face 46 which cooperates with an intermediate portion 47 of the plate 39. The sealing strip 36 also has a sloping outer face 48 between the face 46 and a vertical outer face 49. The face 48 cooperates with a lower portion 50 of the plate 39. An upper portion 51 of the plate 39 is provided with the longitudinally spaced slots 41 that are spaced along the portion 51 at distances corresponding to the distances between welded pin bar guides 40. The plate 39 has inwardly bent flanges 52 and 53 on the portions 50 and 51, respectively.

The plate 39 is locked by the pin bar guide 40 and pin bar 42 to urge the flange 53 against the sidewall 31 and at the same time urge the flange 52 against the sloping outer face 48 of the sealing strip 36 to urge the sealing strip 36 against the ledges 34 and 35 and the sidewall 31.

FIGS. 7-9 show in more detail the wedge-shaped pin bar 42 having various holes 56 drilled therein for the reception of split pin 57. After the insertion of the pin bar 42 within the slot 43, the split pin 57 is inserted in the appropriate hole 56 to lock the plate 39 to the pin bar guide 40.

The filter element 22, supported on grid 20, passes under the lower arm 45 of the sealing strip 36 and under the upper arm 44 and around the outer horizontal face 46 and along the sloping face 48. Thus the filter element 22 almost enwraps the sealing strip strip 36 and the only portion of the sealing strip 36 that comes into contact with the precipitate is the vertical outer face 49. A horizontal lower face 60 of the lower arm 45 is urged against the filter element 22 to secure the filter against the upper horizontal edge of the grid 20. An inner vertical face 62 of the lower arm 45 is urged by the plate 39 against the filter cloth 22 to secure the filter element against the upturned rim 20A of the grid 20 thus insuring an effective seal against the ingress of precipitate between the lower arm 45 of the sealing strip 36 and the grid 20. The grid 20, with the rim 70A, is resiliently cushioned by a sealing element 36, preferably of rubber.

Figure 10:
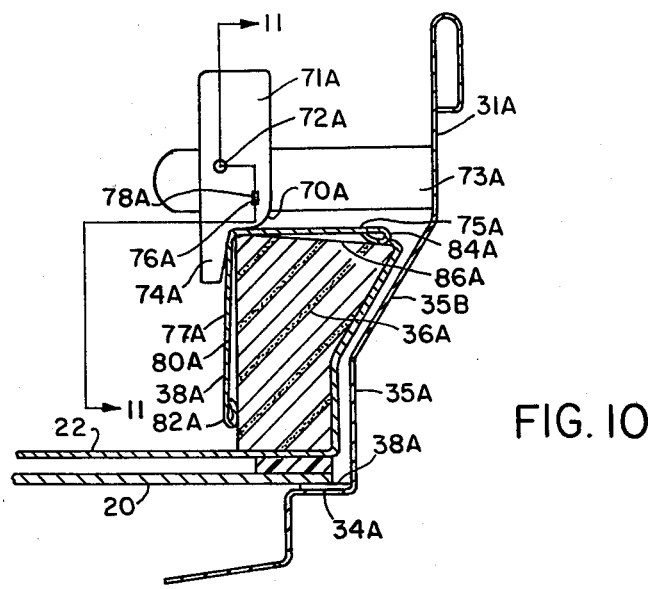
FIG. 10 is a cross-sectional view of a filter element sealing device according to an alternative embodiment of the present invention.

An second embodiment of the invention is shown in FIG. 10 in which a sidewall 31A has a ledge 34A for supporting the outer edge of a grid 20 by a cushioning seal 38A. The filter element 22 is secured against wall portions 35A and 35B by means of a caulking or sealing strip 36A which is urged towards the wall 31A and ledge 34A by an L-section plate 39A. The L-shaped plate 39A is urged against the sealing strip 36A by means of a cam surface 70A of a pivoted member 71A. Pivoted member 71A is pivoted about a pivot pin 72A secured to a bracket 73A which is welded to an upper vertical portion of the sidewall 31A. The cam surface 70A of the member 71A has a stop portion 74A adjacent cam surface 70A to limit the movement of cam surface 70A relative to the upper outer surface 75A of the L-shaped plate 39A. An aperture 76A in the pivoted member 71A is aligned with a corresponding aperture 78A in the bracket 73A when the pivot member 71A is pivoted to a position in which the stop portion 74A has come into contact with the vertical portion 77A of the L-shaped plate 39A. In this position, the plate 39A and sealing strip 36A are urged against the wall 31A. A locking pin 79A is inserted through the aperture 76A and the corresponding aperture 78A in the bracket 73A to lock the pivoted member 71A in a vertical position with the cam surface 70A urging the L-shaped plate 39A and the sealing strip 36A against the sidewall 31A and the ledge 34A.

Figure 11:
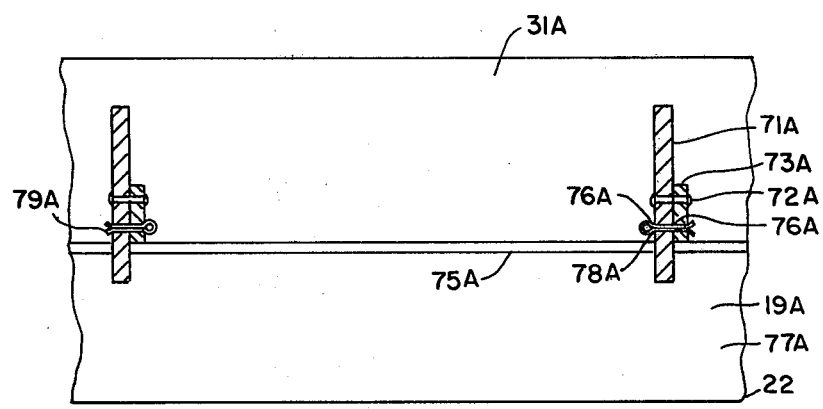
FIG. 11 is a cross-sectional view taken on line 11—11 of the alternative embodiment of FIG. 10.

FIG. 11 shows in more detail the alignment of the aperture 76A with the aperture 78A of the bracket 73A. A split pin 79A inserted through apertures 76A and 78A locks the member 71A and bracket 73A together. The filter element 22, grid 20 and cushion seal 38A are thereby secured between the seal strip 36A and the sidewall 31A and the ledge 34A. As in the case of the first embodiment, the filter element 22 is wrapped around the sealing strip 36A. A vertical outer face 80A is urged by an inwardly turned flange 82A of the vertical portion 77A of the plate 39A against the sidewall 31A. An inwardly turned flange 84A of the upper surface 75A of the plate 39A urges the upper outer face 86A of sealing strip 36A against the sidewall 31A and the ledge 34A.

In a specific example of the preferred embodiment of the invention, the sealing strip is two and one-half inches or 6.35 centimeters in width by two and one-quarter inches or 5.72 centimeters in height. The inward face of the upper arm 44 has a radius of curvature of three-quarters of an inch or 1.19 centimeters. The lower arm 45 has a width of thirteen sixteenths of an inch or 2.06 centimeters. The height stop portion 74A adjacent cam surface 70A to limit the movement of cam surface 70A relative to the upper outer surface 75A of the L-shaped plate 39A. An aperture 76A in the pivoted member 71A is aligned with a corresponding aperture in the bracket 73A when the pivot member 71A is pivoted to a position in which the stop portion 74A has come into contact with the vertical portion 27A of the L-shaped plate 39A. In this position, the plate 39A and sealing strip 36A are urged against the wall 31A. A locking pin 79A is inserted through the aperture 76A and the corresponding aperture in the bracket 73A to lock the pivoted member 71A in a vertical position with the cam surface 70A urging the L-shaped plate 39A and the sealing strip 36A against the sidewall 31A and the ledge 34A.

FIG. 11 shows in more detail the alignment of the aperture 76A with the aperture 78A of the bracket 73A. A split pin 79A inserted through apertures 76A and 78A locks the member 71A and bracket 73A together. The filter element 22, grid 20 and cushion seal 38A are thereby secured between the seal strip 36A and the sidewall 31A and the ledge 34A. As in the case of the first embodiment, the filter element 22 is wrapped around the sealing strip 36A. A vertical outer face 80A is urged by an inwardly turned flange 82A of the vertical portion 77A of the plate 39A against the sidewall 31A. An inwardly turned flange 84A of the upper surface 75A of the plate 39A urges the upper outer face 86A of sealing strip 36A against the sidewall 31A and the ledge 34A.

Figure 12:
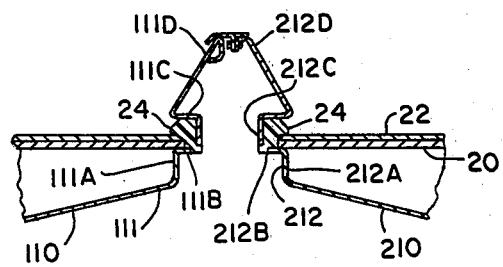
FIG. 12 is a cross-sectional view of an improved interlocking engagement of adjacent filter pans.

FIG. 12 is a cross-sectional view of an improved interlocking engagement between adjacent filter pans 110 and 210. The pans 110 and 210 respectively have sidewalls 111A–111D and sidewalls 212A–212D which are shown being similar to the prior art pan shown in FIG. 3. It should be appreciated by those skilled in the art that the improved sealing device shown in FIGS. 4–11 may be incorporated with this improvement.

Figure 13:
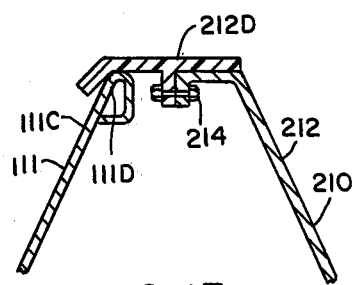
FIG. 13 is an enlarged cross-sectional view of the interlocking engagement of FIG. 12.

In the embodiment shown in enlarged form in FIG. 13, the terminal end 111D is received by a lip 212D to insure that the feed slurry shown in FIG. 1 is not lost between adjacent pans. In the prior art pan 10A shown in FIG. 3, the terminal end 11D and the lip 12D were constructed of rigid stainless steel thereby creating severe damage to the terminal end 11D and/or the lip 12D during malfunction of the machine during the tilting operation as shown in FIG. 1. This damage caused loss of material as well as loss of time to repair or replace the damaged portion of the pan.

The improvement in FIGS. 12 and 13 illustrate a resilient lip 212D, preferably made of a rubber material, affixed to the pan 212 by suitable means. In this embodiment, the resilient lip 212D is secured to the pan 212 by bolts 214 but it should be understood that numerous other means may be employed to affix the lip 212D to the pan 212.

The resilient lip 212D forms the desired interlocking engagement with terminal end 111D of pan 110 with a substantial reduction in repair and maintenance costs.

In a specific example of the preferred embodiment of the invention shown in FIGS. 4–9 the sealing strip is two and one-half inches or 6.35 centimeters in width by two and one-quarter inches or 5.72 centimeters in height. The inward face of the upper arm 44 has a radius of curvature of three-quarters of an inch or 1.19 centimeters. The lower arm 45 has a width of thirteen sixteenths of an inch or 2.06 centimeters. The height of the face 49 is one inch, or 2.54 centimeters while the width of the face 46 is one and three eighths inch, or 3.49 centimeters.

In a specific example of the second embodiment of the invention shown in FIGS. 10 and 11, the sealing strip is of Geor rubber. The locking mechanism is fabricated from one inch × quarter inch (2.54 × 0.64 centimeters) bar.

An important aspect of the present invention is the provision of a sealing device in which a minimum surface area of the caulking or sealing strip comes into contact with the phosphate precipitate and in which the sealing strip can be rapidly and easily removed from the sidewall of the filter pan.

The present disclosure includes that contained in the appended claims as well as the foregoing description. Although the invention has been described with a certain degree of particularity, it is understood that the present disclosure in the preferred form has been made only by way of example and that numerous changes in the details of construction and the combination and arrangement of parts may be resorted to without departing from the spirit and scope of the invention.

What is claimed is:

1. A filter pan filter element sealing device for sealing the peripheral edge of a filter element adjacent the sidewall of a filter pan, comprising in combination:
   a peripheral sidewall of the filter pan;
   a ledge disposed on said sidewall;
   a sealing strip cooperating with said ledge;
   said strip having a plurality of faces disposed on an outer surface of said strip; and
   means including a longitudinal extending member removably secured to said sidewall cooperating with said plurality of said faces for urging aid strip against said ledge to seal the peripheral edge of the filter element between said sealing strip and said peripheral sidewall of the filter pan.

2. A filter pan filter element sealing device as set forth in claim 1, wherein said longitudinal extending member includes a plate secured to said sidewall.

3. A filter pan filter element sealing device as set forth in claim 2 wherein said plate extends along the length of said sidewall.

4. A filter pan filter element sealing device as set forth in claim 3 wherein said plate has two longitudinal edges, each of said edges having an inwardly turned flange.

5. A filter pan filter element sealing device as set forth in claim 4, wherein said plate defines an aperture which receives a pin bar guide disposed on said sidewall;
   said pin bar guide defining a slot which lockably receives a cotter pin inserted therein.

6. A filter pan filter element sealing device as set forth in claim 5, wherein said plate includes three portions; an upper portion thereof defining said aperture and an intermediate portion thereof lying adjacent a horizontal face of said outer surface of said sealing strip.

7. A filter pan filter element sealing device as set forth in claim 6, wherein said inwardly turned flanges of said upper and said lower portions react with the sidewall and a sloping face of said outer surface of said sealing means, respectively.

8. A filter pan filter element sealing device as set forth in claim 7, wherein a horizontal face is disposed on said outer surface and a lower face is disposed on an inner surface, each of said horizontal and lower faces lying in planes substantially parallel to the plane of the filter element.

9. A filter pan filter element sealing device as set forth in claim 8, wherein said sealing strip is of rubber.

10. A filter pan filter sealing device for sealing the peripheral edge of a filter element adjacent the sidewall of a filter pan comprising:
    a peripheral sidewall of the filter pan;
    a contour having a plurality of surfaces disposed on said peripheral sidewall of the filter pan;

a sealing strip having a portion thereof for cooperatively mating with said contour of said peripheral sidewall;

a longitudinally extending member disposed adjacent one portion of said sealing strip with the peripheral edge of the filter element disposed adjacent to a second portion of said sealing strip; and means for urging said longitudinally extending member toward said peripheral sidewall enabling said sealing strip to seal the peripheral edge of the filter element between said sealing strip and said peripheral sidewall of the filter pan.

11. A filter pan filter sealing device as set forth in claim 10, wherein said longitudinal member includes an aperture therethrough;

said means for urging comprises a bar guide secured to the peripheral sidewall and extending through said aperture; and a wedge extending through a wedge aperture in said bar guide for urging said longitudinal member upon insertion of said wedge in said wedge aperture.

* * * * *

UNITED STATES PATENT AND TRADEMARK OFFICE
CERTIFICATE OF CORRECTION

PATENT NO. : 4,391,706
DATED : July 5, 1983
INVENTOR(S) : Richard W. Steinkraus

It is certified that error appears in the above-identified patent and that said Letters Patent is hereby corrected as shown below:

Fig. 3, should appear as shown below instead of as in the patent.

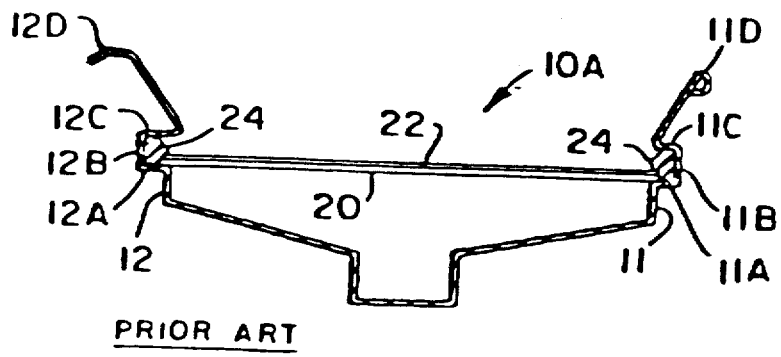

PRIOR ART

FIG. 3

Signed and Sealed this

Eighteenth Day of February 1986

[SEAL]

Attest:

DONALD J. QUIGG

Attesting Officer    Commissioner of Patents and Trademarks